(12) United States Patent
Xia et al.

(10) Patent No.: US 9,490,725 B2
(45) Date of Patent: Nov. 8, 2016

(54) MULTI-STAGE PROGRAMMABLE RECTIFIER WITH EFFICIENCY TRACKING

(71) Applicant: The State of Oregon acting by and through the State Board of Higher Education on behalf of Oregon State University, Corvallis, OR (US)

(72) Inventors: Lingli Xia, San Diego, CA (US); Patrick Y. Chiang, Corvallis, OR (US); Jiao Cheng, Portland, OR (US)

(73) Assignee: Oregon State University, Corvallis, OR (US)

( * ) Notice: Subject to any disclaimer, the term of this patent is extended or adjusted under 35 U.S.C. 154(b) by 283 days.

(21) Appl. No.: 14/212,478

(22) Filed: Mar. 14, 2014

(65) Prior Publication Data

US 2014/0268964 A1 Sep. 18, 2014

Related U.S. Application Data

(60) Provisional application No. 61/784,622, filed on Mar. 14, 2013.

(51) Int. Cl.
*H02M 3/07* (2006.01)
*H02M 7/25* (2006.01)

(52) U.S. Cl.
CPC ......... *H02M 7/25* (2013.01); *H02M 2003/078* (2013.01)

(58) Field of Classification Search
CPC ............... H02M 2003/078; H02M 2003/076; H02M 3/07; H02M 3/073; H02M 3/075
See application file for complete search history.

(56) References Cited

U.S. PATENT DOCUMENTS

| 4,214,174 A | 7/1980 | Dickson | |
|---|---|---|---|
| 5,912,560 A * | 6/1999 | Pasternak | H03K 17/063 307/110 |
| 2011/0002150 A1* | 1/2011 | Yoo | H02M 7/219 363/127 |
| 2011/0124310 A1 | 5/2011 | Theilmann et al. | |
| 2011/0164026 A1* | 7/2011 | Wu | H02M 3/07 345/214 |

OTHER PUBLICATIONS

Papotto et al., "A 90-nm CMOS Threshold-Compensated RF Energy Harvester," *IEEE Journal of Solid-State Circuits*, 46:1985-1997 (Sep. 2011).
Dickson, "On-chip High-Voltage Generation in MNOS Integrated Circuits Using an Improved Voltage Multiplier Technique," *IEEE Journal of Solid-State Circuits*, SSC-11:374-378 (Sep. 2011).

(Continued)

*Primary Examiner* — Harry Behm
(74) *Attorney, Agent, or Firm* — Klarquist Sparkman, LLP

(57) ABSTRACT

Examples of multi-stage programmable rectifiers are provided herein. Each rectifier stage can include a first transistor and a switch connected to the first transistor. A threshold voltage of the first transistor can be programmed through selection of one of a plurality of voltages available at the switch. Each rectifier stage can also include a second transistor that can be connected in series with the first transistor. An output capacitor can be connected to the second transistor at an output of the rectifier stage. The plurality of voltages provided at the switch allows the threshold voltage of the first transistor to be adjusted in either a positive or negative position to increase efficiency of the rectifier. A calibration process can be used to identify the position of each switch in the rectifier stages that results in the highest efficiency or rectifier output voltage.

14 Claims, 11 Drawing Sheets

(56) References Cited

OTHER PUBLICATIONS

Albright, et al., "OLAM: A wearable, non-contact sensor for continuous heart-rate and activity monitoring," *Int. Conf. of the IEEE Eng. in Med. and Biol. Soc.*, pp. 5625-5628 (Sep. 2011).

Papotto et al., "A 90nm CMOS 5Mb/s crystal-less RF transceiver for RF-powered WSN node," *IEEE Int. Solid-State Circuits Conf. (ISSCC) Dig. Tech. Papers*, pp. 452-453 (Feb. 2012).

Zhang et al., "A batteryless 19μW MICS/ISM-band energy harvesting body area sensor node SoC," *IEEE Int. Solid-State Circuits Conf. (ISSCC) Dig. Tech. Papers*, pp. 298-299 (Feb. 2012).

Liao et al., "A 3μW wirelessly powered CMOS glucose sensor for an active contact lens," *IEEE Int. Solid-State Circuits Conf. (ISSCC) Dig. Tech. Papers*, pp. 38-39 (Feb. 2011).

Cheng et al., "A near-threshold, multi-node, wireless body area sensor network powered by RF energy harvesting," *IEEE Custom Integrated Circuits Conf. (CICC)*, pp. 1-4 (Sep. 2012).

Mercier et al., "A 110μW 10Mb/s etextiles transceiver for body area networks with remote battery power," *IEEE Int. Solid-State Circuits Conf. (ISSCC) Dig. Tech. Papers*, pp. 496-497 (Feb. 2010).

Lin et al., "Power-efficient rendez-vous schemes for dense wireless sensor networks," *IEEE Int. Conf. on Comm.*, pp. 3769-3776 (Jun. 2004).

Theilmann et al, "A μW complementary bridge with near zero turn-on voltage in SOS CMOS for wireless power supplies," *IEEE Trans. Circuits Syst. I, Reg. Papers*, 59:2111-2124 (Sep. 2012).

Balachandran et al., "A 110 nA voltage regulator system with dynamic bandwidth boosting for RFID systems," *IEEE J. Solid-State Circuits*, 41:2019-2028 (Sep. 2006).

Musa et al., "Progressive mixing technique to widen the locking range of division-ratio injection-locked frequency dividers," IEEE Trans. *Microw. Theory Techn.*, 61:1161-1173 (Mar. 2013).

Hu et al., "0.16-0.25 pJ/bit, 8 Gb/s near-threshold serial link receiver with super-harmonic injection-locking," *IEEE J. Solid-State Circuits*, 47:1842-1853 (Aug. 2012).

Zhang et al., "A 23 μA RF-Powered Transmitter for Biomedical Applications," *IEEE RF IC Symp.*, pp. 1-4 (Jun. 2011).

Ma et al., "A near-threshold 0.16 nJ/b OOK-transmitter with 0.18 nJ/b noise-cancelling super-regenerative receiver for the medical implant communication service," *IEEE Trans. Biomed. Circuits and Syst.*, 7:841-850 (Dec. 2013).

Toso et al., "UWB fast-hopping frequency generation based on sub-harmonic injection locking," *IEEE J. Solid-State Circuits*, 43:2844-2852 (Dec. 2008).

Chen et al., "A calibration-free 800MHz fraction-N digital PLL with embedded TDC," *IEEE Int. Solid-State Circuits Conf. (ISSCC) Dig. Tech. Papers*, pp. 472-473 (Feb. 2010).

Izad et al. "A 17pJ/bit 915MHz 8PSK/O-QPSK transmitter for high data rate biomedical applications," *IEEE Custom Integrated Circuits Conf. (CICC)*, pp. 1-4 (Sep. 2012).

Pandey et al., "A sub-100 μW MICS/ISM band transmitter based on injection-locking and frequency multiplication," *IEEE J. Solid-State Circuits*, 46:1049-1058, (May 2011).

Maffezzoni, "Computing the synchronization regions of injection-locked strongly nonlinear oscillators for frequency division applications," *IEEE Trans. Computer-Aided Design and Integrated Circuits and Syst.*, 29:1849-1857 (Dec. 2010).

Verma et al. "A unified model for injection-locked frequency dividers," *IEEE J. Solid-State Circuits*, 38:1015-1027 (Jun. 2003).

\* cited by examiner

MULTI-STAGE PROGRAMMABLE RECTIFIER WITH EFFICIENCY TRACKING

CROSS-REFERENCE TO RELATED APPLICATION

This application claims the benefit of U.S. Provisional Application No. 61/784,622, filed on Mar. 14, 2013 and titled "RADIO FREQUENCY ENERGY HARVESTING WITH POWER CONVERSION EFFICIENCY TRACKING," which is incorporated herein by reference in its entirety.

STATEMENT AS TO RIGHTS TO INVENTIONS MADE UNDER FEDERALLY SPONSORED RESEARCH OR DEVELOPMENT

This invention was made with government support under 0901883-ECCS awarded by National Science Foundation. The government has certain rights in this invention.

BACKGROUND

Many powered devices rely upon rectifiers to convert an alternating current (AC) power source to a direct current (DC) power source. In recent years, energy harvesting for low-power devices has emerged as a use for rectifiers. Devices such as implantable biomedical sensors, for example, can be powered by receiving radio frequency (RF) energy and rectifying the RF energy to provide a DC voltage to the sensor. Rectified RF energy can then be used in place of a battery, allowing the size of sensors to be reduced.

Increasing rectifier efficiency in such applications makes more power available for use by a sensor or allows a sensor to operate with less received RF energy. Conventional attempts at increasing rectifier efficiency, however, are limited to fixed operating conditions.

SUMMARY

Examples described herein relate to multi-stage programmable rectifiers. A first circuit stage can comprise a first transistor. The first circuit stage is configured such that a voltage of the first transistor is programmable. A second transistor can be connected between the first transistor and a first circuit stage output. A first stage output capacitor can be connected between the first circuit stage output and ground. A second circuit stage is connected to the first circuit stage. The second circuit stage comprises a third transistor connected to the first circuit stage output. The second circuit stage is configured such that a voltage of the third transistor is programmable. A fourth transistor can be connected between the third transistor and a second circuit stage output. A second stage output capacitor can be connected between the second circuit stage output and ground.

In some examples, each rectifier stage in a multi-stage programmable rectifier includes a first transistor and a switch connected to the first transistor. A threshold voltage of the first transistor can be programmed through selection of one of a plurality of voltages available at the switch. Each rectifier stage can also include a second transistor that can be connected in series with the first transistor. An output capacitor can be connected to the second transistor at an output of the rectifier stage.

In some examples, a multi-stage programmable rectifier can be calibrated. Configurations for a plurality of switches in the multi-stage programmable rectifier can be determined. Each respective switch is coupled to a corresponding transistor. Selection of one of a plurality of voltages available at the switch can control a threshold voltage of the transistor and an output voltage of a corresponding rectifier stage. The rectifier output voltage can be determined based on the configurations. The configurations for the plurality of switches can be iteratively modified, and corresponding rectifier output voltages can be determined. Based on the iterative modification of the configurations, configurations for the plurality of switches can be identified that result in the highest rectifier output voltage of the determined rectifier output voltages.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

DETAILED DESCRIPTION

The examples described herein relate generally to multi-stage programmable rectifiers. Rectifiers are being increasingly used in RF energy harvesting to provide power, especially for low-power applications. As used herein, "energy harvesting" refers to receiving an AC RF signal and rectifying the signal to produce a DC voltage. In this way, energy external to a device (e.g. a biomedical sensor) is "harvested" from the surrounding environment for use by the device. Although many of the examples described herein relate to biomedical sensors, multi-stage programmable rectifiers can be used in a variety of applications and contexts.

Sensor System Overview Examples

Real-time monitoring sensors for personalized healthcare (EEG, ECG, blood pressure monitoring, etc.) have been increasing in importance, due to the rise of mobile devices, which can receive sensor data, and the escalating costs of healthcare. CMOS technology has allowed a typical sensor core to be integrated into an extremely small size of only several $mm^2$. Device miniaturization, however, is often limited by the size of a battery used to power the sensor. Batteries not only increase the cost, size, and weight of a sensor, but batteries are also inconvenient to recharge or replace, particularly for implanted sensor devices. Engineers have begun to design devices that harvest energy from the environment (solar energy, thermoelectricity, piezoelectricity, RF energy, etc.) to power the devices and thus eliminate the battery. RF energy is often used because of its programmability.

Figure 1:
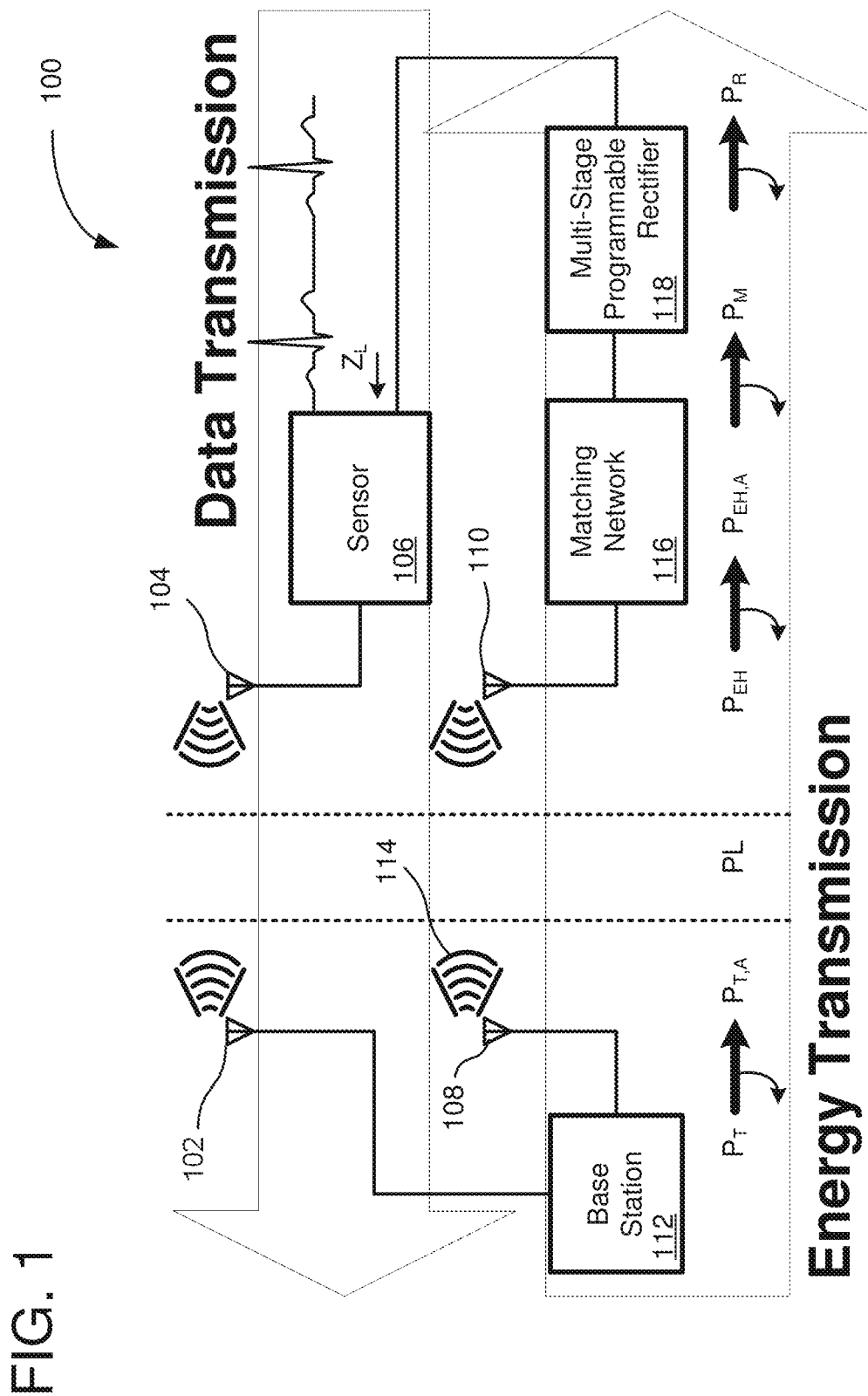
FIG. 1 illustrates an example battery-less sensor system that harvests RF energy.

In battery-less systems that harvest RF energy, a rectifier can be used to convert received RF energy to a DC voltage that can supply power to a sensor. A battery-less sensor system 100 powered by wireless RF energy harvesting is shown in FIG. 1. In addition to a communication channel formed between antenna 102 and antenna 104 that is used for data communication to and/or from sensor 106, antenna 108 and antenna 110 form a second channel that is used for energy transmission. A base station transmitter 112 sends an RF signal 114 having a transmitted power $P_T$. As a result of an imperfect impedance match and energy loss in antenna 108, the transmitted power through antenna 108 is $P_{T,A}$.

After experiencing a path loss (PL) due to wireless channel propagation, RF signal 114 having power $P_{EH}$ is received by antenna 110 and enters an impedance matching network 116. At the output from impedance matching network 116, RF signal 114 has a power of $P_M$. Multi-stage programmable rectifier 118 rectifies the RF signal 114 to a DC voltage. Multi-stage programmable rectifier 118 can be configured similarly to the examples described herein. As a result of the signal loss in the antenna, propagation, matching network, and rectifier, the harvested energy output by rectifier 118 is $P_R$. The power conversion efficiency (PCE) of system 100 as a whole, $\eta_{All}$, is:

$$\eta_{All} = \eta_{T,A} \cdot PL \cdot \eta_{EH} = \frac{P_{T,A}}{P_T} \cdot PL \cdot \frac{P_R}{P_{EH}} = \frac{P_R}{P_T} \quad (1)$$

where $\beta_{T,A}$ is the PCE of antenna 108 and $\eta_{EH}$ is the energy harvesting PCE (including antenna 110, matching network 116, and rectifier 118). Various loss mechanisms, including PL and $\eta_{EH}$, are frequency dependent. The higher the efficiency, the longer energy transmission distance or the lower transmitted power required for a fixed distance.

In some examples, base station 112 and antenna 108 are part of a mobile device such as a smart phone. In the case of implanted biomedical sensors, a patient can use the mobile device as a power source to power a battery-less implanted sensor and also receive readings from the sensor. An example typical output voltage provided by a rectifier to a biomedical sensor is a 1 V output and a 1 µA rectifier load.

Multi-Stage Programmable Rectifier Overview Examples

Multi-stage programmable rectifiers, such as multi-stage programmable rectifier 118 in FIG. 1, achieve a more efficient operation than conventional rectifiers by allowing programmed control over the load current consumed by the rectifier. For example, the load current can be programmed to save power when the rectifier input power is small or adjusted to increase the performance when the input power is large. The programmability of the rectifier also enables compensation for other unpredictable environmental factors that can significantly affect efficiency such as process, voltage, and temperature (PVT) variations or differences in absorption/permittivity due to human body interaction. Conventional rectifiers, in contrast, can only be designed for a single operating condition and cannot adapt to changing needs or circumstances.

A multi-stage programmable rectifier can be calibrated periodically or on-demand to maintain high efficiency under various circumstances (e.g. PVT, input power and load current variations, etc.) As used herein, "calibration" refers to programming a multi-stage programmable rectifier for a desired outcome such as high power level or high efficiency. Calibrating for efficiency can be a foreground or a background process. As a foreground process, a rectifier stops harvesting energy while calibrating. As a background process, the rectifier can harvest energy and calibrate simultaneously. A duty-cycled wireless sensor can, for example, implement calibration as a foreground process. Calibration is discussed in detail below with respect to FIGS. 5 and 6.

Figure 2:
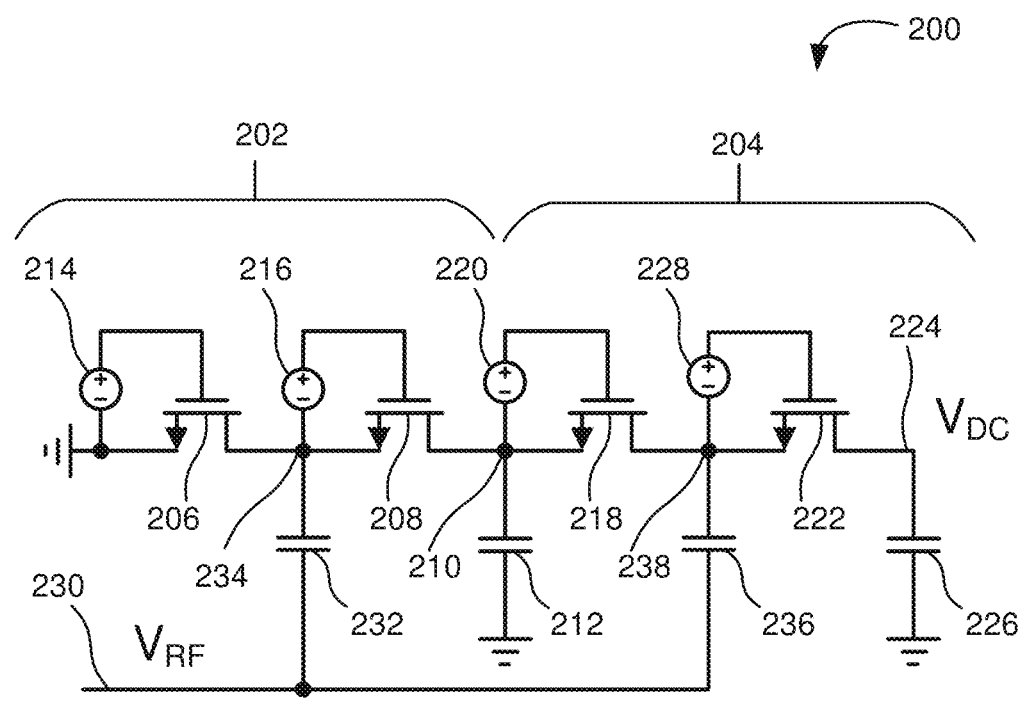
FIG. 2 illustrates an example multi-stage programmable rectifier circuit in which a bias voltage is applied to transistor gates.

FIG. 2 illustrates a multi-stage programmable rectifier 200. Rectifier 200 includes a first circuit stage 202 and a second circuit stage 204. First circuit stage 202 includes a first transistor 206 and a second transistor 208. Second transistor 208 is connected between first transistor 206 and a first circuit stage output 210. A first stage output capacitor 212 is connected between first circuit stage output 210 and ground. First circuit stage 202 is configured such that a voltage of first transistor 206 is programmable. In FIG. 2, the programmable voltage is the threshold or gate-to-source voltage. This is represented in FIG. 2 by a DC bias voltage 214, which can be zero, positive, or negative. In some examples, first circuit stage 202 is also configured such that a voltage of second transistor 208 is programmable, as represented by a DC bias voltage 216. Configuring a circuit such that a transistor has a programmable voltage can result in added parasitic capacitance, so in some examples, only one of first transistor 206 or second transistor 208 have a programmable voltage.

Second circuit stage 204 is connected to first circuit stage 202. Second circuit stage 204 comprises a third transistor 218 connected to first circuit stage output 210. Second circuit stage 204 is configured such that a voltage of third transistor 218 is programmable, as represented by a DC bias voltage 220. A fourth transistor 222 is connected between third transistor 218 and a second circuit stage output 224. A second stage output capacitor 226 is connected between second circuit stage output 224 and ground. In some examples, second circuit stage 204 is also configured such that a voltage of fourth transistor 222 is programmable, as represented by a DC bias voltage 228.

In FIG. 2, first transistor 206, second transistor 208, third transistor 218, and fourth transistor 222 are field effect transistors (FETs), specifically N-channel metal oxide semiconductor (NMOS) FETs. Multi-stage programmable rectifiers can also be implemented using complementary metal oxide semiconductor (CMOS) or P-channel metal oxide semiconductor (PMOS) FETs, bipolar junction transistors (BJTs), or other transistor types. In some examples, rectifier 200 includes one or more additional circuit stages (not shown in FIG. 2). Each of the one or more additional circuit stages can have at least two transistors and be configured such that a voltage of at least one of the two transistors is programmable. A higher number of rectifier stages can result in a lower efficiency, but additional stages can be used to provide a higher output DC voltage and/or an input impedance match (for example, to a 50 ohm antenna).

Rectifier 200 produces a DC or substantially DC voltage at second circuit stage output 224 from an RF AC input voltage ($V_{RF}$) at rectifier input 230. A first input capacitor 232 is connected between rectifier input 230 and a connection 234 between first transistor 206 and second transistor 208. A second input capacitor 236 is connected between rectifier input 230 and a connection 238 between third transistor 218 and fourth transistor 222.

Figure 3:
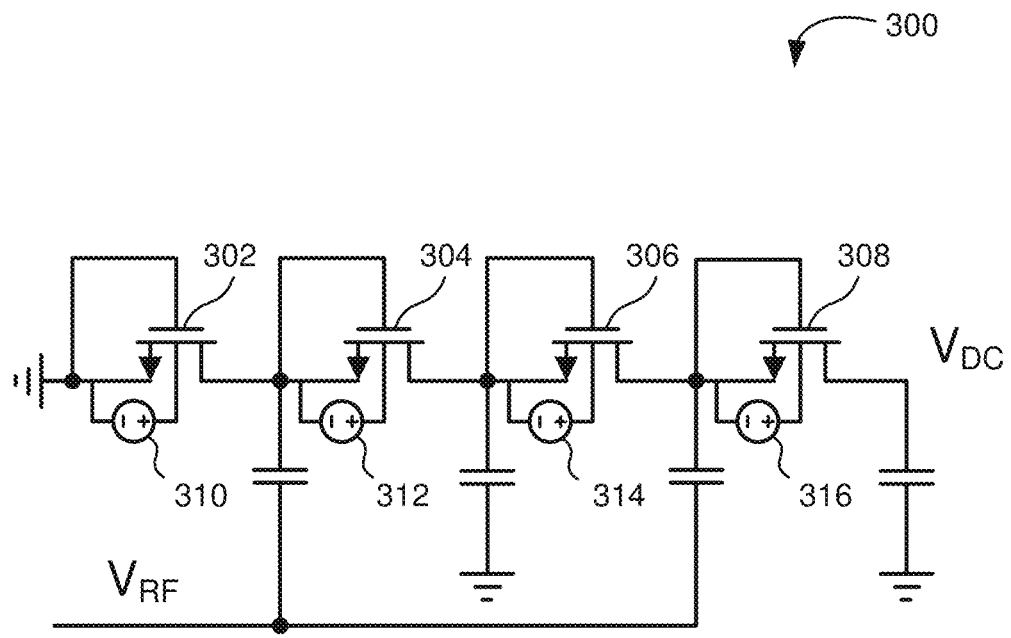
FIG. 3 illustrates an example multi-stage programmable rectifier circuit in which a bias voltage is applied to transistor substrates.

First circuit stage 202 and second circuit stage 204 are configured such that the gate voltages of first transistor 206 and second transistor 208 are programmable. A programmable gate voltage results in a programmable threshold voltage, $V_{th}$. The threshold voltage of a FET is the gate-source voltage at which the conducting channel is established and begins to allow current flow. The threshold voltage can also be programmed by programming a substrate voltage, as shown in multi-stage programmable rectifier 300 in FIG. 3. In FIG. 3, the threshold voltage of transistors 302, 304, 306, and 308 is programmable via DC bias voltages 310, 312, 314, and 316 that are connected to the substrates of transistors 302, 304, 306, and 308, respectively.

Returning to FIG. 2, rectifier 200 functions by charging first input capacitor 232 and second input capacitor 2236 and then transferring this charge to first output capacitor 212 and second output capacitor 226, respectively. When $V_{RF}$ is less than $-V_{th}$, first transistor 206 and third transistor 218 are switched on and charge first input capacitor 232 and second input capacitor 236, respectively, while second transistor 208 and fourth transistor 222 remain off. When $V_{RF}$ is greater than $V_{th}$, second transistor 208 and fourth transistor 222 are switched on and charge first stage output capacitor 212 and second stage output capacitor 226, respectively, while first transistor 206 and third transistor 218 are turned off. Due to transistor nonidealities, while $-V_{th} < V_{RF} < V_{th}$, first transistor 206, second transistor 208, third transistor 218, and fourth transistor 222 are not completely switched off, resulting in leakage current. A tradeoff exists between turn-on current and leakage current while choosing the threshold voltage.

The output voltage ($V_{DC}$) of an N-stage rectifier is:

$$V_{DC} \approx 2N(V_{RF} - V_{loss}) \quad (2)$$

where, $V_{loss}$ is introduced by threshold voltage and finite on-resistance and leakage current. The PCE of the rectifier is then:

$$\eta_R = \frac{P_{out,DC}}{P_{in,RF}} = \frac{V_{DC}^2 / R_{out}}{V_{RF}^2 / 2R_{in}} \quad (3)$$

As can be understood from equation 3, with a fixed input power and load resistance, efficiency increases as $V_{DC}$ increases.

Although FIGS. 2 and 3 illustrate programmability of rectifiers 200 and 300 by tuning $V_{th}$ through a gate or substrate bias voltage, multi-stage rectifiers can be made programmable by, for example, tuning the number of stages or adjusting transistor size. For example, a number of active transistor units can be changed by changing a digital control word. In the case of tuning $V_{th}$ by programming substrate voltage as shown in FIG. 3, increasing the DC bias applied to the substrate of the MOS transistor decreases $V_{th}$. In the case of tuning $V_{th}$ by programming gate voltage as shown in FIG. 2, the gate bias voltage is boosted by a value $V_b$, which is equivalent to reducing the threshold voltage by a value of $V_b$. The value of $V_b$ can be different among transistors, especially in those processes where deep n-well NMOS transistors are not available.

Figure 4:
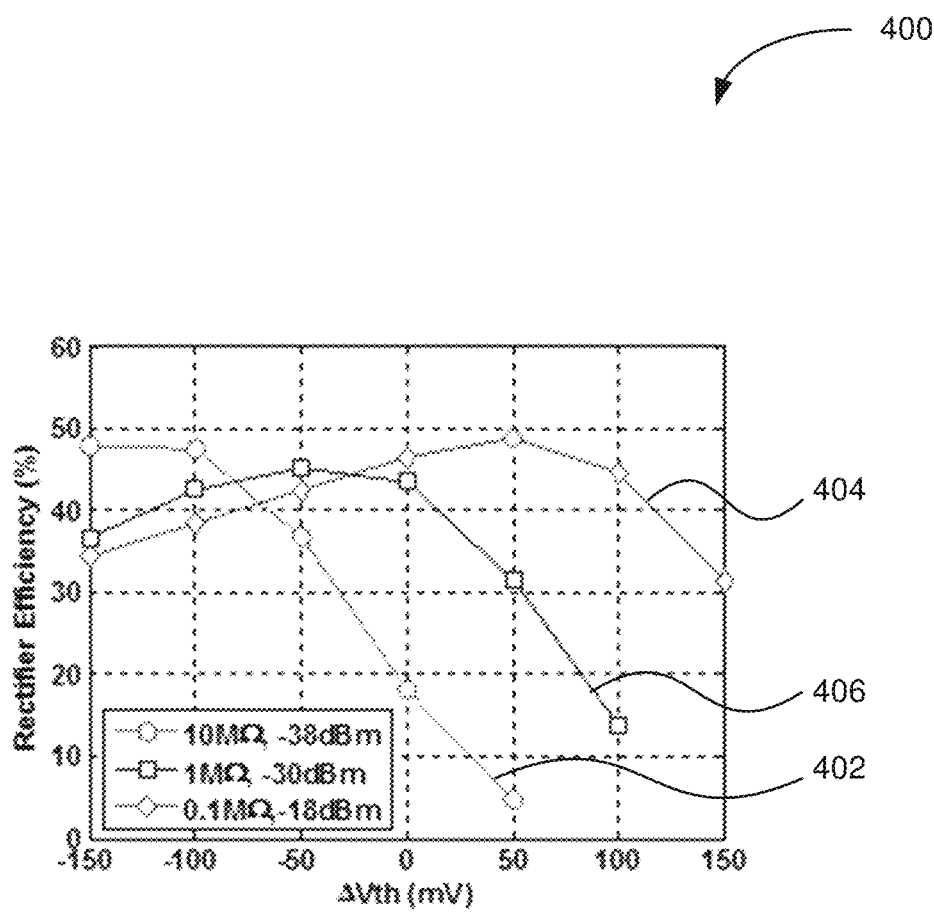
FIG. 4 illustrates a graph of efficiency of a two-stage rectifier vs. change in threshold voltage.

FIG. 4 illustrates a graph 400 showing empirically determined efficiency of a two-stage programmable rectifier vs. changing $V_{th}$ for a particular input power and load resistor (representing the load of the rectifier as a whole). The threshold voltage is tuned in steps of 50 mV while searching for the highest efficiency with limited input power. As can be seen in plot 402, with a 10M Ω load resistor and −38 dBm input power, the maximum efficiency (maximum that occurs at 50 mV steps) of 47.8% is achieved by decreasing the threshold voltage by −150 mV. When the load resistor and input power are 0.1 MΩ and −18 dBm, respectively, as shown in plot 404, the efficiency is reduced to 34.5% under the same bias voltage, such that the maximum efficiency is achieved by increasing the threshold voltage by 50 mV. Similarly, when the load resistor and input power are 1 MΩ and −30 dBm, respectively, as shown in plot 406, a maximum efficiency is found by decreasing $V_{th}$ by 50 mV.

Figure 5:
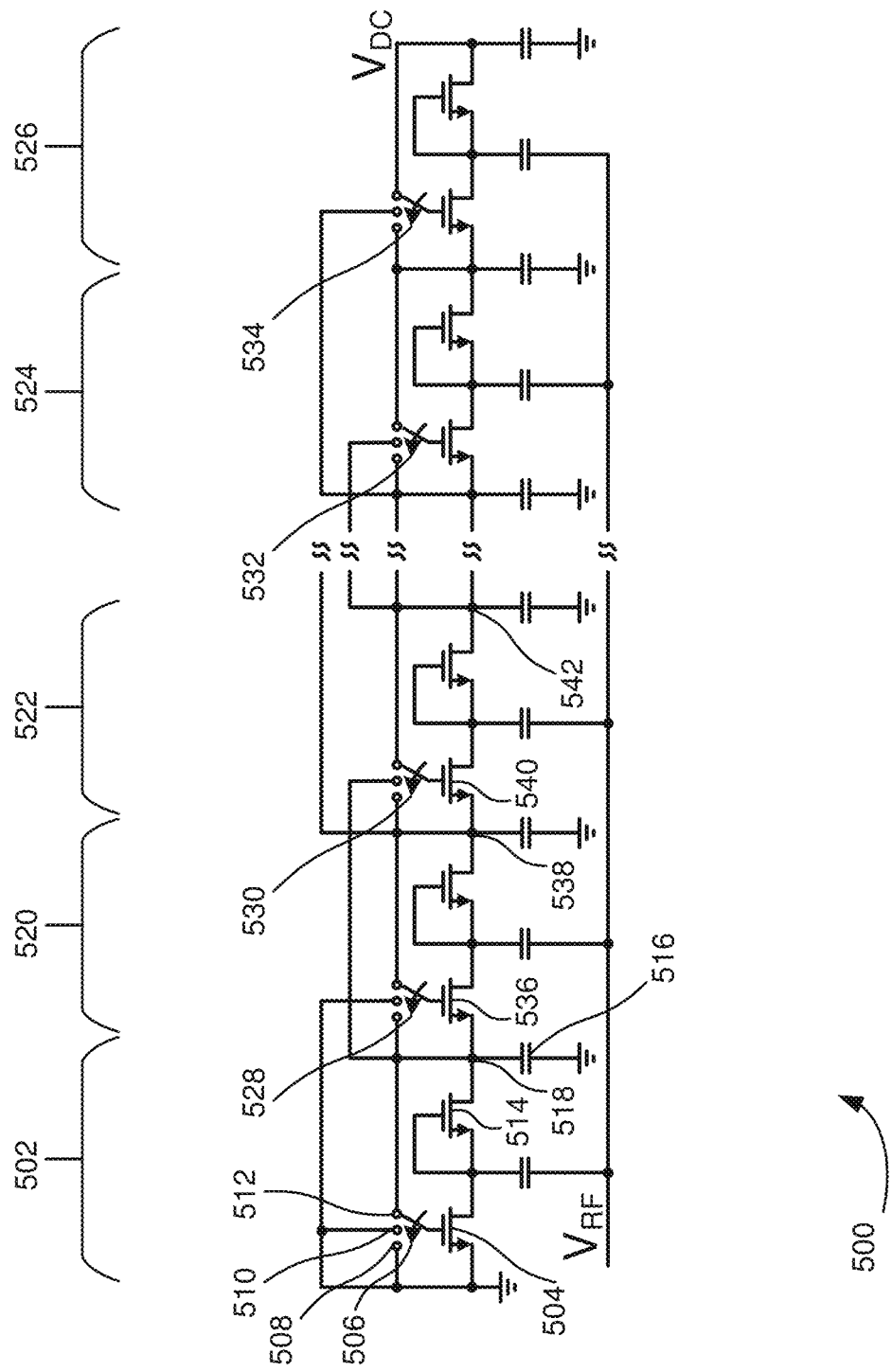
FIG. 5 illustrates an example multi-stage programmable rectifier having twelve stages.

FIG. 5 illustrates a 12-stage programmable rectifier 500. In RF energy harvesting, a multi-stage rectifier is usually employed to achieve a proper input impedance to be matched to a 50Ω (or other impedance) antenna. In a multi-stage rectifier, the DC output increases with a larger number of stages such that an inherent stepped bias voltage is available at the output of each stage.

As FIG. 4 illustrates, depending on rectifier load resistor (or correspondingly, load current) and input power, $V_{th}$ may need to be tuned both in the positive and negative direction to reach the highest efficiency given the components used and available tuning steps. Rectifier 500 in FIG. 5 allows tuning $V_{th}$ in both directions. The general operation of rectifier 500 is similar to that of rectifiers 200 and 300 of FIGS. 2 and 3, respectively. For clarity, only five stages of rectifier 500 are shown in FIG. 5.

In rectifier 500, first rectifier stage 502 includes a first transistor 504. Switch 506 is connected to first transistor 504. A threshold voltage of first transistor 504 can be programmed through selection of one of a plurality of voltages 508, 510, or 512 available at switch 506. In some examples, two, four, or more voltages are available at switch 506. A second transistor 514 is connected in series with first transistor 504. An output capacitor 516 is connected to second transistor 514 at an output 518 of first rectifier stage 502. FIG. 5 illustrates second rectifier stage 520, third rectifier stage 522, eleventh rectifier stage 524, and twelfth rectifier stage 526 having second switch 528, third switch 530, eleventh switch 532, and twelfth switch 534, respectively. Although not shown for clarity, rectifier 500 also includes intervening stages between third rectifier stage 522 and eleventh rectifier stage 524. Each of second rectifier stage 520 through twelfth rectifier stage 526 is similarly configured.

In FIG. 5, switches 506, 528, 530, 532, and 534 are connected to the gates of the corresponding transistors. In some examples, switches 506, 528, 530, 532, and 534 are connected to the substrates of the corresponding transistors. In first rectifier stage 502, the source and gate of second transistor 514 are connected to the drain of first transistor 504, and switch 506 is connected to the gate of first transistor 504. A similar configuration is used in the other rectifier stages.

Switches 506, 528, 530, 532, and 534 are used to program the threshold voltage of the transistors to which they are connected. For example, by programming switch 528, the gate of transistor 536 in second rectifier stage 520 can be connected to the output 518 of first rectifier stage 502, to the source of transistor 504, or to the output 538 of second rectifier stage 520, thus getting a $\Delta V_{th}$ of 0, $-V_{DC}/N$, $V_{DC}/N$, respectively. A larger tuning step can be realized by switching the gate to the input of an M-th ($1 \leq M \leq N$) lower stage or the output of a K-th ($0 \leq K \leq N-1$) higher stage. Dummy rectifier stages can also be employed to extend the tuning step size. The gate bias of the second transistor in each stage, such as second transistor 514, can be statically connected to the source as shown in FIG. 5 or they can also be programmable similar to first transistor 504 and connected to a switch.

Similarly, by programming switch 530 in third rectifier stage 522, the gate of transistor 540 can be connected to the output 518 of first rectifier stage 502, the output 538 of second rectifier stage 520, or the output 542 of third rectifier stage 522. In this way, the voltages available at the switch in each subsequent stage include the voltage at the output of the stage and a voltage at the output of at least one (or two) previous stages. In some examples, switches 506, 528, 530, 532, and 534 are independently controllable. In other examples, some or all of the switches are programmed together. In some examples, rectifier 500 comprises at least ten stages. In some examples, rectifier 500 comprises two or more stages. Rectifier 500 can comprise any number of stages greater than one, and the selection of the number of stages can be dictated by the impedance of antenna coupling an RF AC input signal to rectifier 500.

In the circuits shown herein (e.g., FIGS. 2, 3, and 5), additional components not shown such as capacitors, resistors, and diodes may also be included in various positions.

Efficiency Calibration Examples

Figure 6:
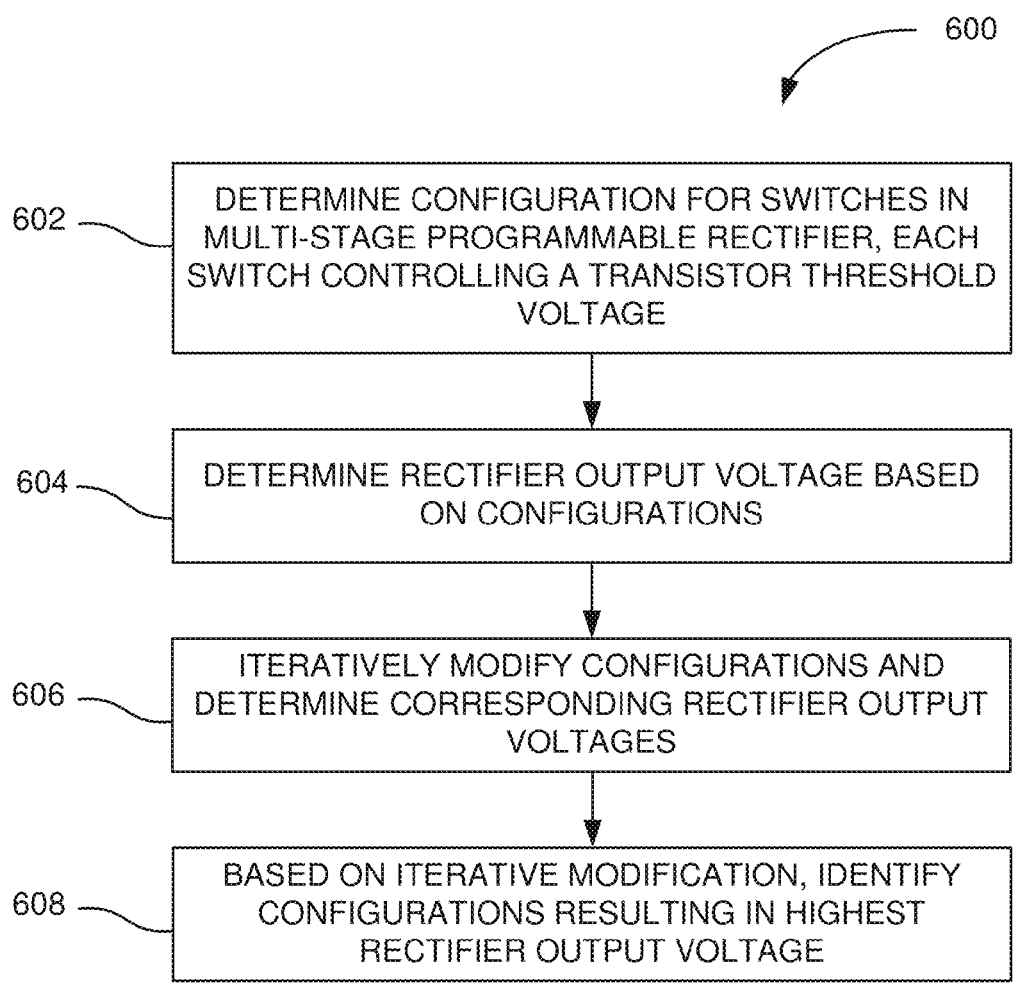
FIG. 6 is a flow chart illustrating an example method of calibrating a multi-stage programmable rectifier.

A multi-stage programmable rectifier such as rectifier 500 can be calibrated to identify the highest efficiency available given the voltages available at the switches of each stage. FIG. 6 illustrates a method 600 of calibrating a multi-stage programmable rectifier. In process block 602, configurations are determined for a plurality of switches in the multi-stage programmable rectifier. Each respective switch is coupled to a corresponding transistor. Selection of one of a plurality of voltages available at the switch controls a threshold voltage of the transistor and an output voltage of a corresponding rectifier stage. A rectifier output voltage is determined in process block 604 based on the configuration. In process block 606, the configurations for the plurality of switches are iteratively modified and corresponding rectifier output voltages are determined.

In some examples, the iterative modification proceeds until a rectifier output voltage has been determined for all configurations for the plurality of switches, until a rectifier output voltage has been determined that meets or exceeds a pre-determined threshold, or until a time threshold has been reached. Based on the iterative modification of the configurations, configurations are identified in process block 608 for the plurality of switches that result in the highest rectifier output voltage of the determined rectifier output voltages. In some examples, the rectifier output voltage is determined using at least one of a voltage sensor or a current sensor. When a maximum available efficiency is identified for certain conditions, the switches can be programmed to the efficient configuration.

Figure 7:
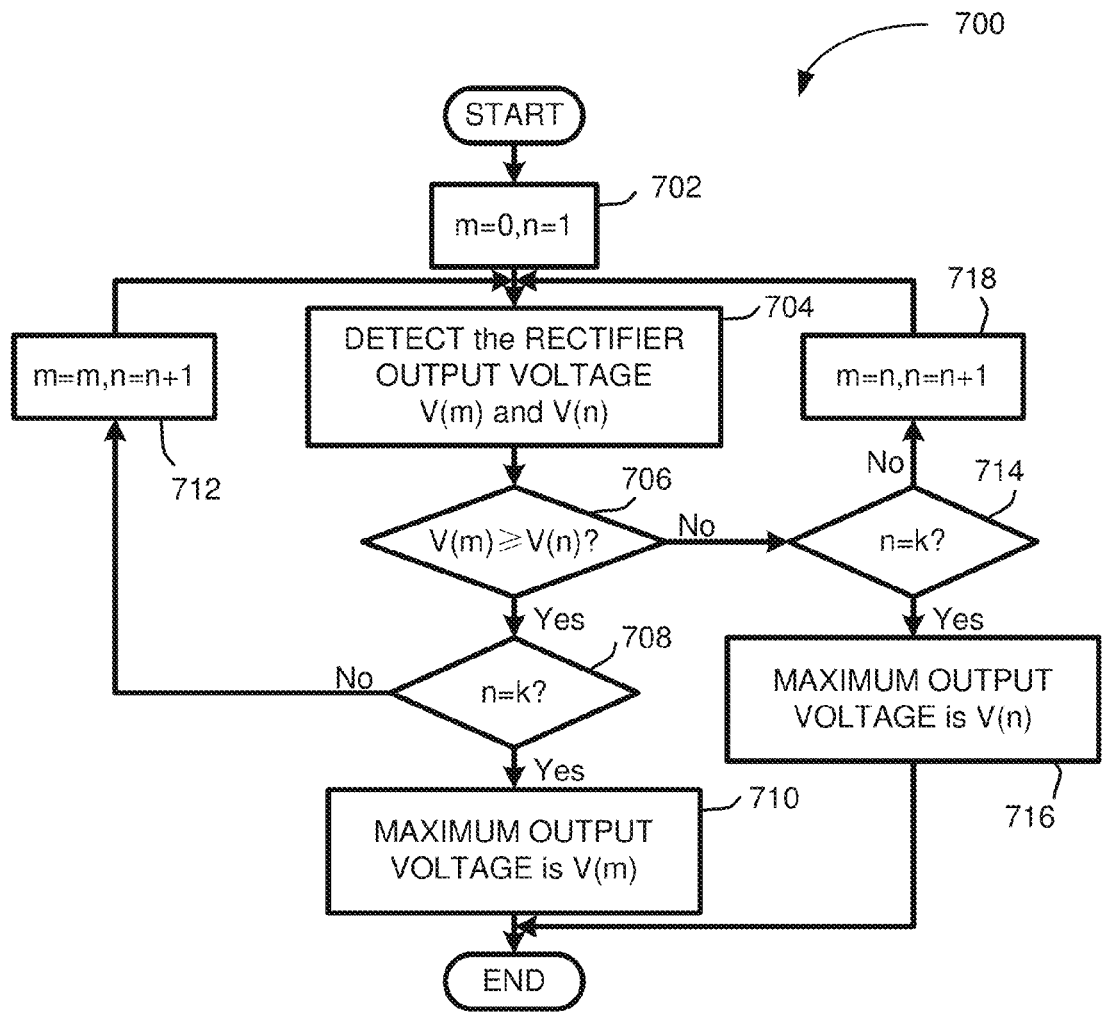
FIG. 7 is a flow chart illustrating an example method of calibrating a multi-stage programmable rectifier in which all available configurations are evaluated.

FIG. 7 is a flow chart illustrating a method 700 of iterative modification that proceeds through all available configurations. For the purposes of FIG. 7, assume the rectifier has a total of k programmable statuses and that V(m) and V(n) represents the m-th status and n-th status output voltage of the rectifier, respectively. In process block 702, m is set to 0 and n is set to 1. A voltage sensor (or current sensor) detects the rectifier output voltage V(m) and V(n) or charging current I(m) and I(n) in process block 704. In process block 706, V(m) is compared to V(n). If V(m) is greater than or equal to V(n), then n is compared to k in process block 708. If n is equal to k, then the maximum available output voltage is found which is V(m) in process block 710. If n is less than k in the comparison in process block 708, then m remains m and n is set to n+1 in process block 712. The next round of detection and comparison then begins. If in process block 706 V(m) is smaller than V(n), and n is equal to k in process block 714, then the maximum available output voltage is found which is V(n) in process block 716. If n is smaller than k in process block 714, m is set to n and n is set to n+1 in process block 718, and the next round of detection and comparison then begins.

Detailed Implementation Examples

Example multi-stage programmable rectifiers have been designed and tested. In one example, a battery-less, multi-node wireless body area network (WBAN) system-on-a-chip (SoC) was demonstrated. An efficiency tracking loop was also implemented that adjusts the rectifier's threshold voltage to increase the efficiency of the wireless harvesting operation, resulting in a minimum RF sensitivity better than −20 dBm at 904.5 MHz. Each SoC node is injection-locked and time-synchronized with the broadcasted RF basestation power (up to a sensitivity of −33 dBm) using an injection-locked frequency divider (ILFD). Hence, every sensor node is phase-locked with the basestation and all nodes can wirelessly transmit TDMA sensor data concurrently. Designed in a 65 nm-CMOS process, the fabricated sensor SoC contains the energy harvesting rectifier and bandgap, duty-cycled ADC, digital logic, as well as the multi-node wireless clock synchronization and MICS-band transmitter. For a broadcasted basestation power of 20 dBm (30 dBm), experimental measurements verify correct powering, sensor reading, and wireless data transfer for a distance of 3 m (9 m). The entire biomedical system application was verified by reception of room and abdominal temperature monitoring.

Figure 8:
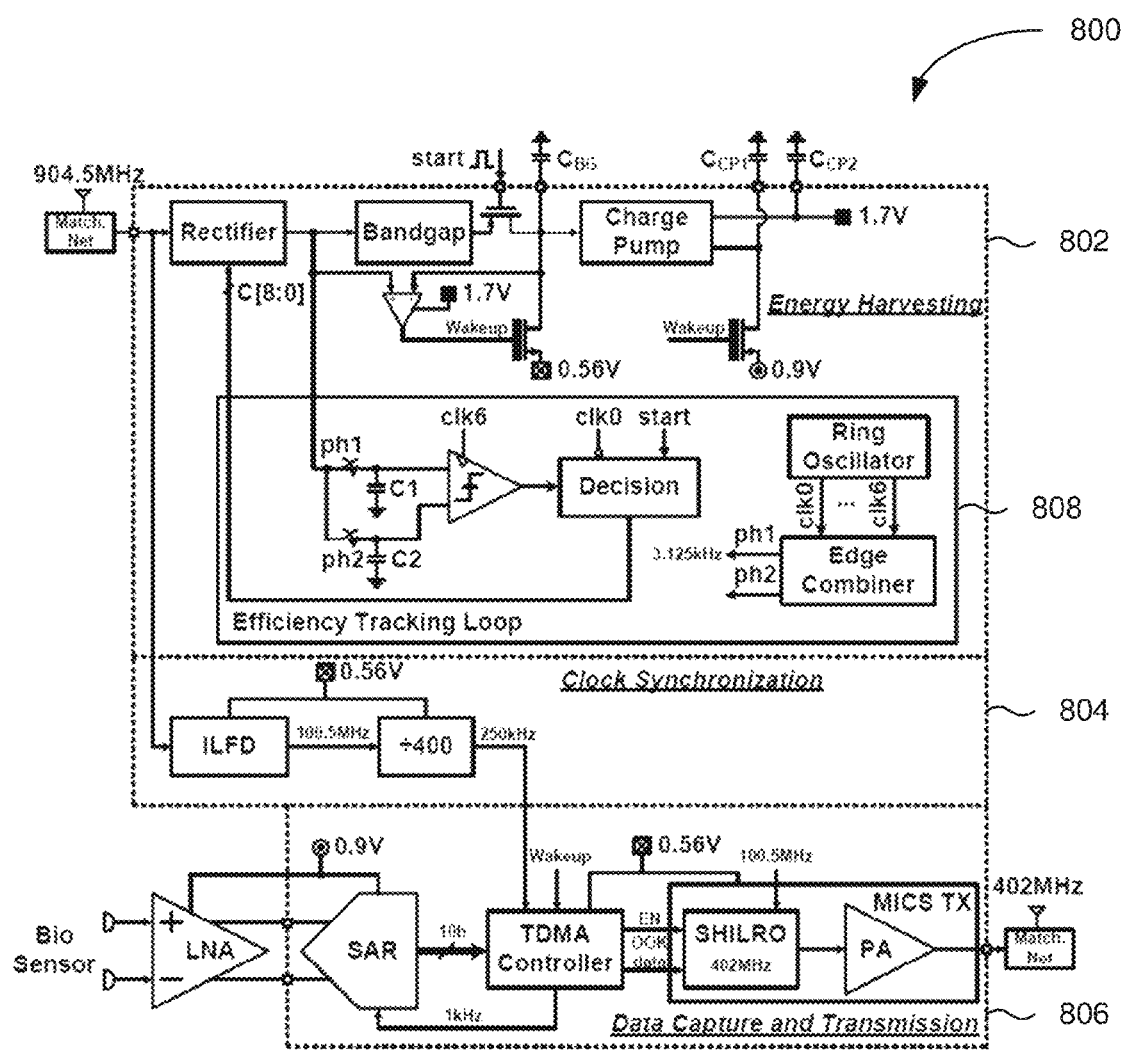
FIG. 8 is a detailed diagram illustrating a tested implementation of an example battery-less sensor system that harvests RF energy.

FIG. 8 illustrates a proposed battery-less sensor system 800 powered by RF energy harvesting. System 800 includes an energy harvesting sub-system 802, a multi-node clock synchronization sub-system 804, and a sensor data capture and RF transmission subsystem 806. For the energy-harvesting, the RF AC input signal is rectified into a DC voltage by the rectifier. In addition, a 0.56 V DC supply voltage, generated by an on-chip bandgap circuit, is utilized in a two-stage charge pump, generating boosted on-chip supply voltages of 0.9 V and 1.7 V. In order to reduce the load current during harvesting, these two supply voltage 0.56 V and 0.9 V are power gated by a wakeup signal.

An on-chip efficiency tracking (calibration) loop 808 is employed that automatically tracks the maximum available efficiency under various operating conditions. The channel access protocol for the multi-node WBAN system is TDMA, but other protocols are also possible. For example, a basestation can broadcast a 2-ASK, 904.5 MHz waveform in the 915 MHz ISM band, where a large transmitted power is required for the energy harvesting phase, while only a small transmitted power is necessary for multi-node synchronization. During the energy-harvesting phase, when the incoming received power of each sensor exceeds the on-chip rectifier sensitivity of −20 dBm, three off-chip surface-mount capacitors are subsequently charged to 0.56 V, 0.9 V and 1.7 V, respectively, providing the three voltage supplies needed for the SoC.

In order to request the sensor node to switch into the data transmission phase, the basestation reduces the 904.5 MHz broadcasted signal power by 8-10 dB. This change in received input power at the SoC is detected by an on-chip envelop detector, consisting of a low-power analog comparator. The comparator detects this change in signal amplitude from the basestation, and generates a wakeup signal that turns on the two power-gating transistors. Timing synchronization between multiple SoC nodes is then achieved by using a divide-by-9 ILFD. For an input frequency of 904.5 MHz, a synchronized output clock of 100.5 MHz is generated and also employed as a reference clock for the 402 MHz transmitter. This 100.5 MHz clock is then further divided by 400 to generate the 250 kHz clock for a TDMA controller. For the sensor data capture and transmission core, the output from a biomedical sensor (e.g. ECG, body temperature) enters into an off-chip low noise amplifier and then quantized by a 10-bit SAR ADC. Next, the TDMA controller enables the radio transmitter during its pre-allocated time slot and transmits the OOK modulated data back to the basestation.

In order to improve the harvesting sensitivity, output power can be reduced while the harvesting efficiency is increased. In the tested system, output power reduction is achieved by decreasing the supply voltage for power-consuming transmitter to 0.56 V, as well as reducing load current during harvesting by introducing two power-gating transistors to turn-off the sensor during energy harvesting and ultra-low power design in bandgap and charge pump.

A harvesting tracking loop 808 is shown in FIG. 8. Harvesting tracking loop consists of two time-interleaved sample-and-hold circuits, a comparator and a digital decision block. Multi-phase clocks employed in this loop are generated by a 7-stage ring oscillator. When the start signal (generated by an off-chip reset button with its supply connected to the harvested 0.9 V) is enabled, the off-chip capacitor $C_{BG}$ and the charge pump are disconnected and the rectifier is reset to status-0. Two non-overlapping sampling clocks ph1 and ph2 for the two sample-and-hold circuits are NAND gated outputs of clk0 and clk5, and clk1 and clk6, respectively.

The decision block changes the control bits in the rectifier during ph1 and ph2 and store the rectified DC output of two consecutive statuses on C1 and C2, respectively. Next, when clk6 goes high, the comparator compares these two stored voltages, and the decision block will then choose the status with a higher output and compare it with the next status. After comparison of all 10 statuses is completed, calibration stops and the rectifier output is set to the maximum output voltage of the ten possible biasing conditions. Thus the maximum available efficiency is achieved, and this calibration loop can be performed periodically to track PVT or input power variations.

Mobile Device Examples

Figure 9:
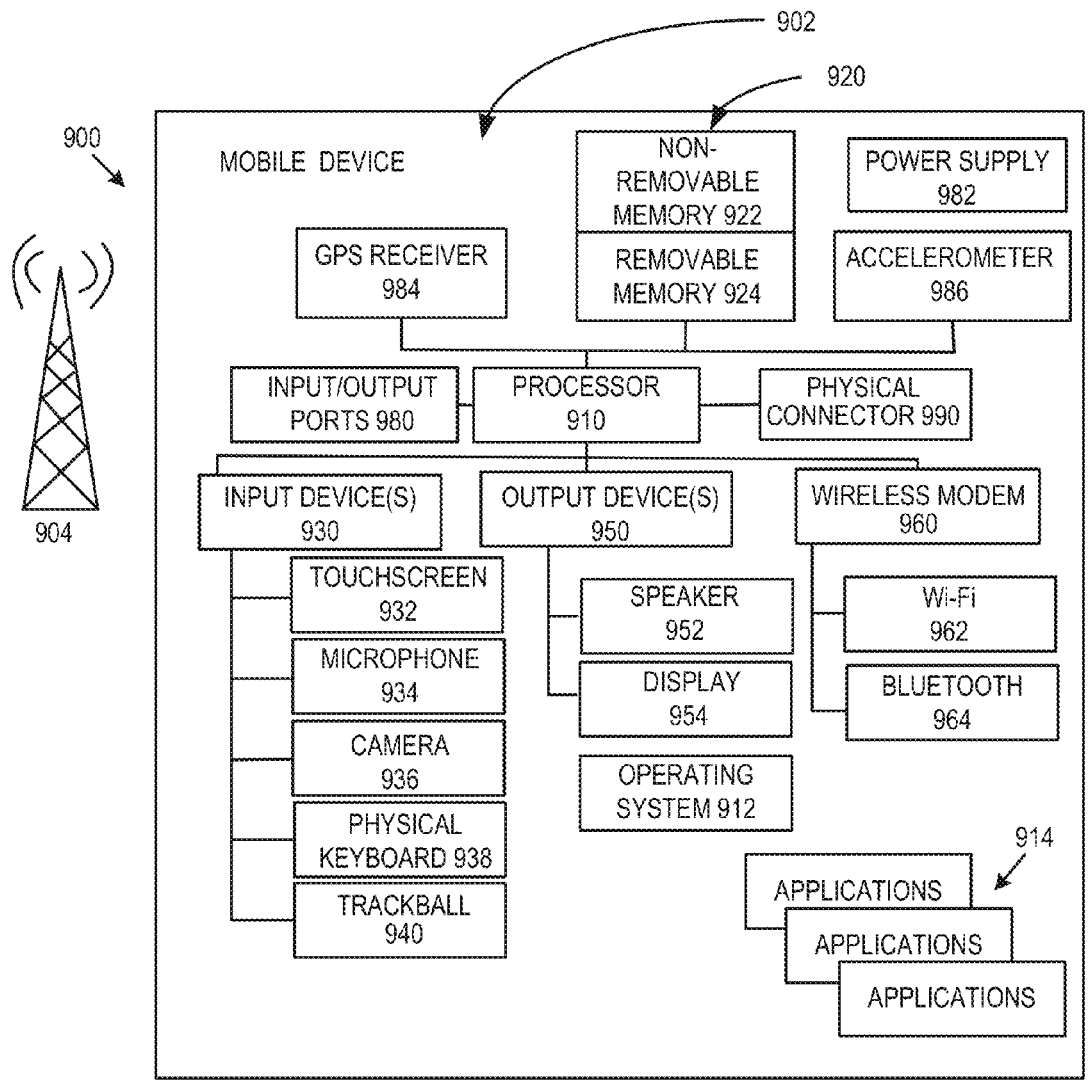
FIG. 9 is a diagram illustrating a generalized mobile device that can be used with some described examples.

FIG. 9 is a system diagram depicting an exemplary mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular or satellite network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs 914 can include common mobile computing applications (e.g., email applications, calendars, contact managers, web browsers, messaging applications), or any other computing application. In some examples, one or more of application programs 914 may control transmission of an RF signal to be rectified and power a sensor. Application programs 914 may also receive and analyze sensor data.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device. The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

Implementation Environment Examples

Figure 10:
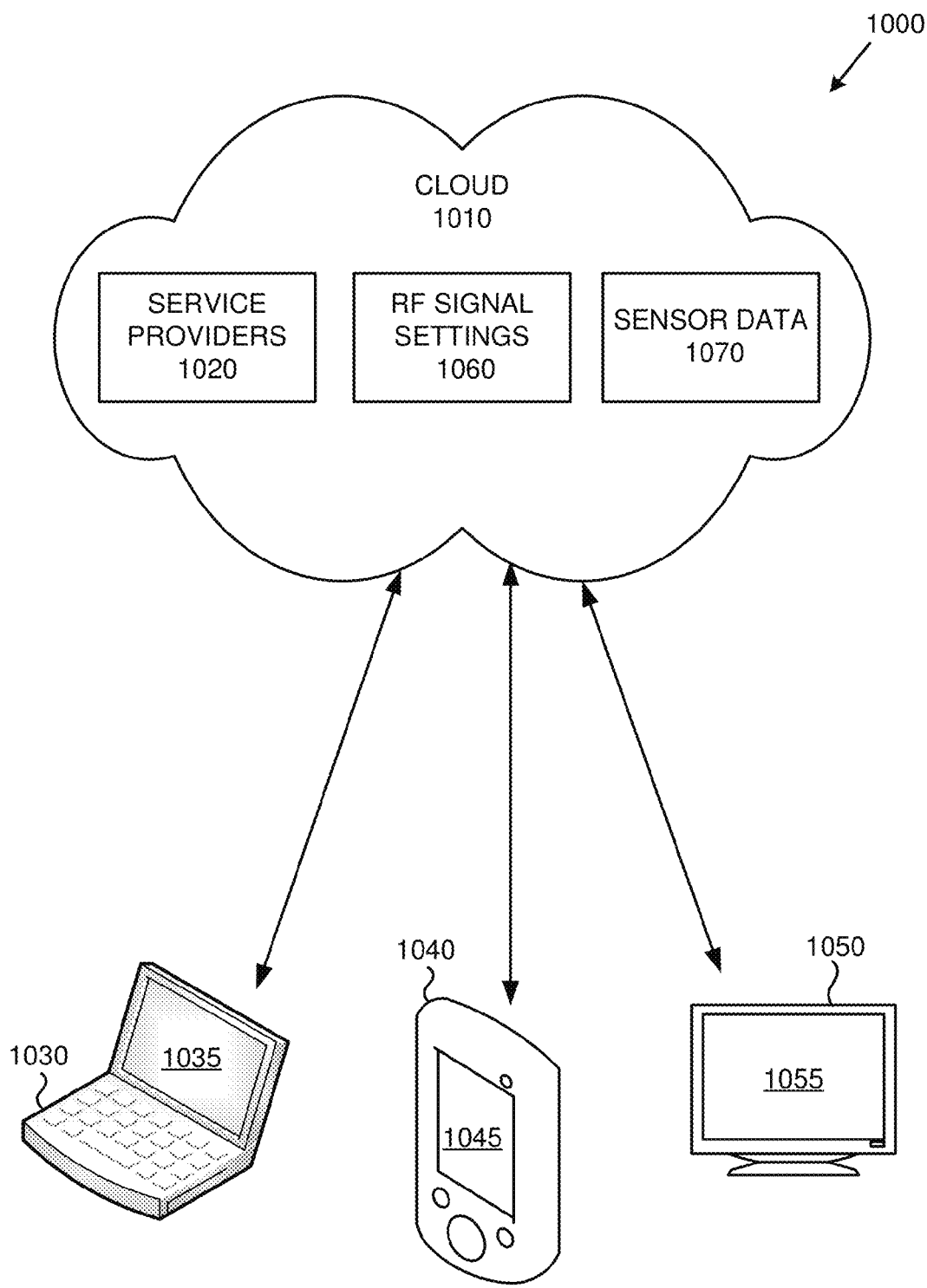
FIG. 10 is a diagram illustrating a generalized implementation environment in which some described examples can be implemented.

FIG. 10 illustrates a generalized example of a suitable implementation environment 1000 in which described embodiments, techniques, and technologies may be implemented.

In example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, or the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, 1050). In some examples, RF signal settings 1060 for controlling an AC RF signal transmitted to a battery-less sensor powered by a multi-stage programmable rectifier can be stored in cloud 1010 and provided to one or more of connected devices 1030, 1040, or 1050. In some examples, received sensor 1070 data can be communicated to and stored in cloud 1010.

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Computing Environment Examples

Figure 11:
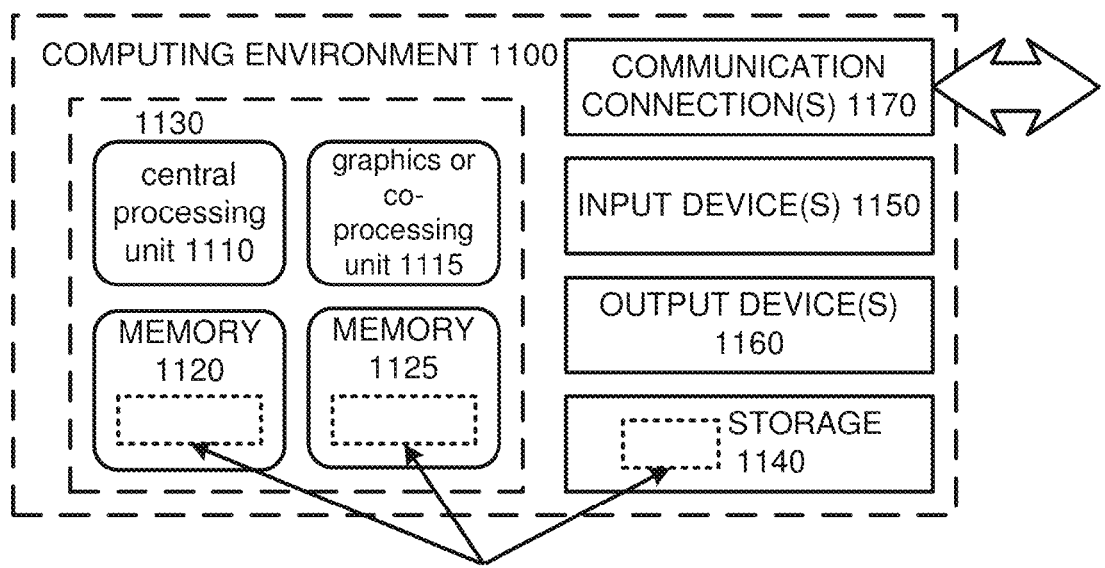
FIG. 11 is a diagram illustrating a generalized example of a suitable computing environment with which some described examples can be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, media player, gaming system, mobile device, etc.)

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s). For example, memory 1120 and 1125 and software 1180 can store computer-executable instructions for online forecasting as described herein.

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information and which can be accessed within the computing environment 1100. The storage 1140 stores instructions for the software 1180 implementing one or more innovations described herein. For example, software 1180 may control transmission of an RF signal to be rectified and power a sensor. Software 1180 may also receive and analyze sensor data.

The input device(s) 1150 may be a touch input device such as a keyboard, mouse, pen, or trackball, a voice input device, a scanning device, or another device that provides input to the computing environment 1100. For video encoding, the input device(s) 1150 may be a camera, video card, TV tuner card, or similar device that accepts video input in analog or digital form, or a CD-ROM or CD-RW that reads video samples into the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A multi-stage programmable rectifier comprising:
   a first circuit stage comprising:
      a first transistor having a gate and a source, wherein the first circuit stage is configured such that a voltage of the first transistor is programmable;

a second transistor connected between the first transistor and a first circuit stage output;

a first stage output capacitor connected between the first circuit stage output and ground; and a first stage switch connected to the gate of the first transistor, the first stage switch connecting the first transistor to any one of a plurality of voltages available at the first stage switch, wherein the plurality of voltages available at the first stage switch is provided by at least the source of the first transistor and the first stage output capacitor, and wherein the voltage of the first transistor is programmable via the first stage switch; and a second circuit stage connected to the first circuit stage, the second circuit stage comprising:

a third transistor connected to the first circuit stage output, the third transistor having a gate and a source, wherein the second circuit stage is configured such that a voltage of the third transistor is programmable;

a fourth transistor connected between the third transistor and a second circuit stage output;

a second stage output capacitor connected between the second circuit stage output and ground; and a second stage switch connected to the gate of the third transistor, the second stage switch connecting the third transistor to any one of a plurality of voltages available at the second stage switch, wherein the plurality of voltages available at the second stage switch is provided by at least the first stage output capacitor, the second stage output capacitor, and the source of the first transistor, and wherein the voltage of the third transistor is programmable via the second stage switch.

2. The multi-stage programmable rectifier of claim 1, further comprising one or more additional circuit stages, each of the one or more additional circuit stages having at least two transistors, and each of the one or more additional circuit stages configured such that a voltage of at least one of the two transistors is programmable.

3. The multi-stage programmable rectifier of claim 1, further comprising:

a first input capacitor connected between an input to the multi-stage programmable rectifier and a connection between the first and second transistors; and a second input capacitor connected between the input to the multi-stage programmable rectifier and a connection between the third and fourth transistors.

4. The multi-stage programmable rectifier of claim 1, wherein the first, second, third, and fourth transistors are field effect transistors, and wherein the programmable voltages of the first transistor and third transistor are threshold voltages.

5. The multi-stage programmable rectifier of claim 1, further comprising:

a third circuit stage connected to the second circuit stage, the third circuit stage comprising:

a fifth transistor connected to the second circuit stage output, the fifth transistor having a gate, wherein the third circuit stage is configured such that a voltage of the fifth transistor is programmable;

a sixth transistor connected between the fifth transistor and a third circuit stage output, a third stage output capacitor connected between the third circuit stage output and ground; and a third stage switch connected to the gate of the fifth transistor, the third stage switch connecting the fifth transistor to any one of a plurality of voltages available at the third stage switch, wherein the plurality of voltages available at the third stage switch is provided by at least the first stage output capacitor, the second stage output capacitor, and the third stage output capacitor.

6. The multi-stage programmable rectifier of claim 1, wherein the multi-stage programmable rectifier is integrated into an implantable biosensor.

7. A multi-stage programmable rectifier having a plurality of rectifier stages, each rectifier stage comprising:

a first transistor, the first transistor having a gate and a drain;

a switch connected to the gate of the first transistor, wherein a threshold voltage of the first transistor can be programmed through selection of one of a plurality of voltages available at the switch;

a second transistor connected in series with the first transistor, the second transistor having a source and a gate, wherein the source and the gate of the second transistor are connected to the drain of the first transistor; and an output capacitor connected to the second transistor at an output of the rectifier stage.

8. The multi-stage programmable rectifier of claim 7, wherein the plurality of rectifier stages comprises a first stage and a plurality of subsequent stages, wherein the voltages available at the switch in the first stage include ground and the voltage at the output of the first rectifier stage, and wherein the voltages available at the switch in each subsequent stage include the voltage at the output of the stage and a voltage at the output of at least one previous stage.

9. The multi-stage programmable rectifier of claim 8, wherein in at least some of the subsequent stages, the voltages available at the switch include the output of at least two previous stages.

10. The multi-stage programmable rectifier of claim 7, wherein the switches of the plurality of rectifier stages are independently controllable.

11. The multi-stage programmable rectifier of claim 7, wherein the multi-stage programmable rectifier comprises at least ten stages.

12. A multi-stage programmable rectifier having a plurality of rectifier stages, the respective rectifier stages comprising:

a first transistor, the first transistor having a substrate;

a switch connected to the substrate of the first transistor, wherein a threshold voltage of the first transistor can be programmed through selection of one of a plurality of voltages available at the switch;

a second transistor connected in series with the first transistor; and an output capacitor connected to the second transistor at an output of the rectifier stage.

13. The multi-stage programmable rectifier of claim 12, wherein the switches of the plurality of rectifier stages are independently controllable.

14. The multi-stage programmable rectifier of claim 12, wherein the multi-stage programmable rectifier is integrated into an implantable biosensor.

* * * * *